(12) United States Patent
Mazzini

(10) Patent No.: US 8,479,913 B2
(45) Date of Patent: Jul. 9, 2013

(54) FEEDER FOR ROBOTS, AUTOMATION MEANS AND THE LIKE

(75) Inventor: Marco Mazzini, Arezzo (IT)

(73) Assignee: ARS S.R.L., Arezzo (IT)

( * ) Notice: Subject to any disclaimer, the term of this patent is extended or adjusted under 35 U.S.C. 154(b) by 196 days.

(21) Appl. No.: 12/998,220

(22) PCT Filed: Oct. 5, 2009

(86) PCT No.: PCT/EP2009/062917
§ 371 (c)(1),
(2), (4) Date: Mar. 28, 2011

(87) PCT Pub. No.: WO2010/040722
PCT Pub. Date: Apr. 15, 2010

(65) Prior Publication Data
US 2011/0174593 A1    Jul. 21, 2011

(30) Foreign Application Priority Data
Oct. 6, 2008 (IT) .............................. AR2008A0032

(51) Int. Cl.
*B65G 43/08* (2006.01)
(52) U.S. Cl.
USPC ......................................... 198/395; 198/391

(58) Field of Classification Search
USPC .................... 198/391, 392, 395, 396; 209/576
See application file for complete search history.

(56) References Cited

U.S. PATENT DOCUMENTS

| | | | | |
|---|---|---|---|---|
| 5,314,055 | A * | 5/1994 | Gordon | 198/395 |
| 5,853,078 | A | 12/1998 | Kneubuhler | |
| 6,056,108 | A * | 5/2000 | Buchi et al. | 198/395 |
| 6,311,825 | B1 | 11/2001 | Schmitt | |
| 6,315,103 | B1 * | 11/2001 | Boucherie | 198/395 |
| 6,328,523 | B1 | 12/2001 | Watanabe et al. | |
| 7,669,707 | B2 * | 3/2010 | Kenneway | 198/398 |
| 2001/0050207 | A1 * | 12/2001 | Kearney | 198/396 |
| 2006/0057239 | A1 | 3/2006 | Hariki et al. | |

FOREIGN PATENT DOCUMENTS

| | | |
|---|---|---|
| EP | 0206095 A2 | 6/1986 |
| EP | 0916457 A2 | 5/1999 |
| GB | 993 645 A | 6/1965 |

* cited by examiner

*Primary Examiner* — James R Bidwell
(74) *Attorney, Agent, or Firm* — Modiano & Partners; Albert Josif; Daniel J. O'Byrne

(57) ABSTRACT

A feeder for robots, automation systems, comprising a frame that has a supporting bed for the parts to be fed and optical cameras for recognizing the parts to be fed, the supporting bed being rotatable about a direction that is substantially perpendicular to the plane of arrangement of the parts to be fed.

14 Claims, 5 Drawing Sheets

FEEDER FOR ROBOTS, AUTOMATION MEANS AND THE LIKE

The present invention relates to a feeder for robots equipped with artificial vision, automation means and the like.

BACKGROUND OF THE INVENTION

The invention presented here is aimed at the field of industrial automation or in any case at all fields related to the introduction of a robotized automatic system, where the demand for flexible robotized systems capable of fulfilling the most disparate requirements is growing continuously.

In particular, the industrial fields of use envisaged for the feeder according to the invention are rubber, plastics and other synthetic materials, glass, the food, cosmetic, pharmaceutical, medical industry, car components, electrical household appliances, computers, consumer electronics, metal findings, the wood industry and the furniture accessory industry, etcetera.

The need is in fact increasingly felt to feed different industrial automation systems according to different production requirements. Currently, industrial products are in fact characterized by an ever shorter lifespan, by decreasing production volumes and by the consequent need to be able to rapidly adapt the plants to the changing production requirements, while trying to minimize the costs of this adaptation.

This ease of adaptation of the plants to different production volumes and the adaptation of production to different end products are often the only economic justification that keeps an automatic production system alive, avoiding the resort to manual systems, which are generally more expensive and slower but far more versatile and force businesses to move production plants to countries where labor is cheaper.

Feeders are known which are controlled by robots of the Cartesian, anthropomorphic, cylindrical type, etcetera.

These feeders are provided with artificial vision systems, such as for example linear, matrix, 3-D and similar television cameras, which require such lighting conditions as to be able to recognize the parts by means of a television camera. The lighting conditions can be created by external lighting from above or by means of a backlighting device arranged normally below the bed that supports the parts.

The feeder is filled from the outside periodically and manually by means of a hopper, with a belt-type elevator or in other ways.

The artificial vision system recognizes the part loaded onto the feeder that is needed for production and the robot picks it up.

These known devices produce the advancement of the parts that constitute the feed for the robots by means of mechanical shaking and/or linear movement obtained by means of motorized belts.

One problem of these feeders is due to the fact that when the parts to be fed comprise at least one cylindrical portion, they tend to roll, offering statistically most frequently to the robot parts that cannot be gripped easily, failing to feed it.

With this type of feeder, be it with linear and/or vibration advancement, it is not possible to vary in all cases the position and arrangement of the parts on the surface, thus slowing the production chain, with severe costs on final production.

Moreover, due to difficult accessibility to the internal parts of known feeders, cleaning the backlighting system is more complicated, penalizing the quality of the vision system and therefore the efficiency of the production.

Another disadvantage of a device of this type is that once pickup has been performed, it is not always possible to vary easily or rapidly the position and arrangement of the parts to be gripped on the bed and therefore such parts must be returned to the production cycle together with the new load of parts to be gripped.

At the end of the pickup, therefore, the parts that have remained on the bed are unloaded from the feeder and reintroduced into the process just described so that a continuous cycle (loop) occurs.

The parts are reintroduced during the step for loading by means of chutes, ramps and other conveyor belts.

It can be deduced easily that such a method is too slow and laborious, since the pickup operation ends with the depletion of all the parts, sometimes taking an indefinite number of cycles that is difficult to predict.

In addition to this, since the robot must unload the feeder at the end of the pickup and then load it again, excessively long nonproductive times or downtimes occur.

Last but not least, due to the above, in order to return the rejected parts to the cycle it is necessary to provide a large space that is sufficient to allow the rejected parts to be transferred from the outlet to the inlet of the feeder by movement means, such as conveyor belts, ramps and chutes. These means, which often cause jammings especially during vibration, require the constant intervention of an assigned operator and therefore affect importantly the economy of the device.

SUMMARY OF THE INVENTION

The aim of the present invention is to eliminate the drawbacks noted above in known types of feeders for robots, automation means and the like, by allowing parts that comprise cylindrical portions to change their arrangement and position on the surface so that the robot can be fed without any problems.

Within this aim, an object of the invention is to provide a feeder for robots, automation means and the like that allows easy access to the internal parts, simplifying the operation for cleaning the vision system.

Another object of the invention is to provide a feeder for robots, automation means and the like that is easy to assemble with means that are easily commercially available and by using commonly used materials, so that the feeder is economically competitive.

Another object of the invention is to provide a feeder which is able to allow the provision of a grip method that limits the assistance of assigned personnel during production, attempting therefore to avoid jamming of the parts during each cycle.

Another object of the invention is to limit the number of cycles to which each item is to be subjected before it is selected by the vision means and then picked up by the robot.

This aim, these objects and others that will become better apparent hereinafter are achieved by a feeder for robots, automation means and the like, according to the invention, which comprises a frame that has a supporting bed for the parts to be fed and vision means for recognizing said parts to be fed, characterized in that said supporting bed is connected to means for rotation about a direction that is substantially perpendicular to the plane of arrangement of said parts to be fed.

BRIEF DESCRIPTION OF THE DRAWINGS

Further characteristics and advantages of the invention will become better apparent from the following detailed description of a preferred but not exclusive embodiment of the feeder for robots, automation means and the like, illustrated by way of non-limiting example by the accompanying drawings, wherein.

DESCRIPTION OF THE PREFERRED EMBODIMENTS

Figure 1:
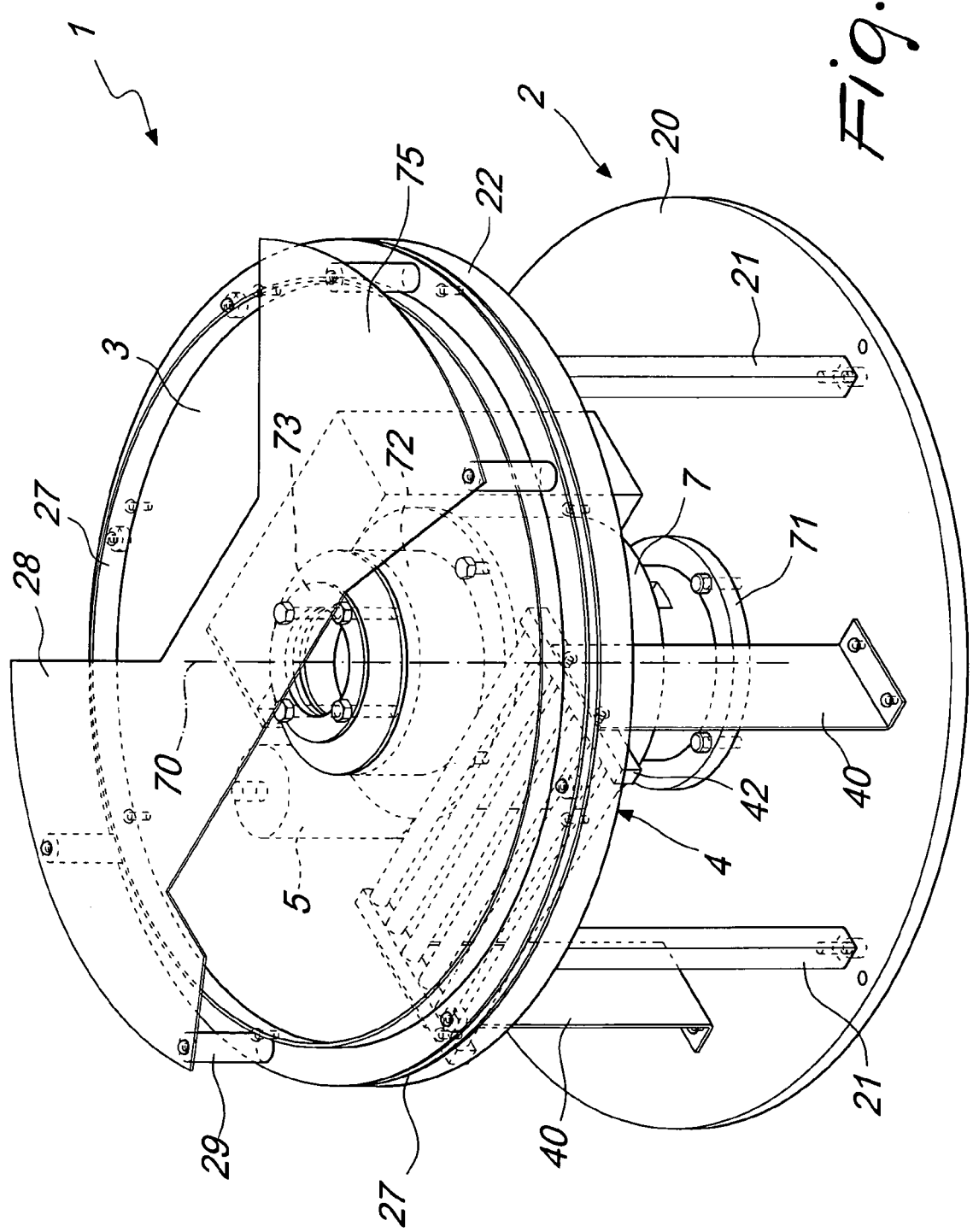
FIG. 1 is a perspective view of a feeder according to the invention.
Figure 2:
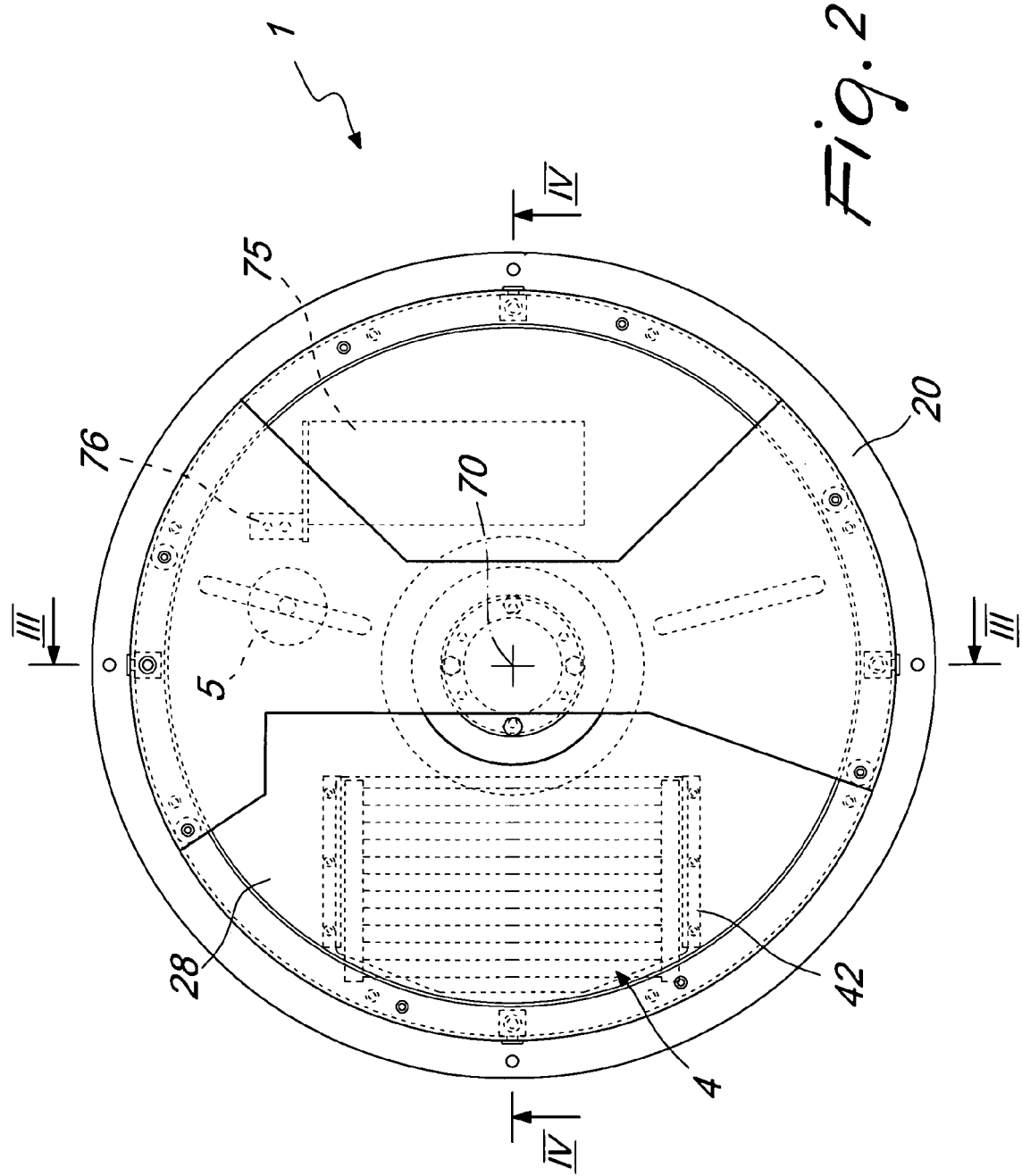
FIG. 2 is a top plan view of the feeder.
Figure 3:
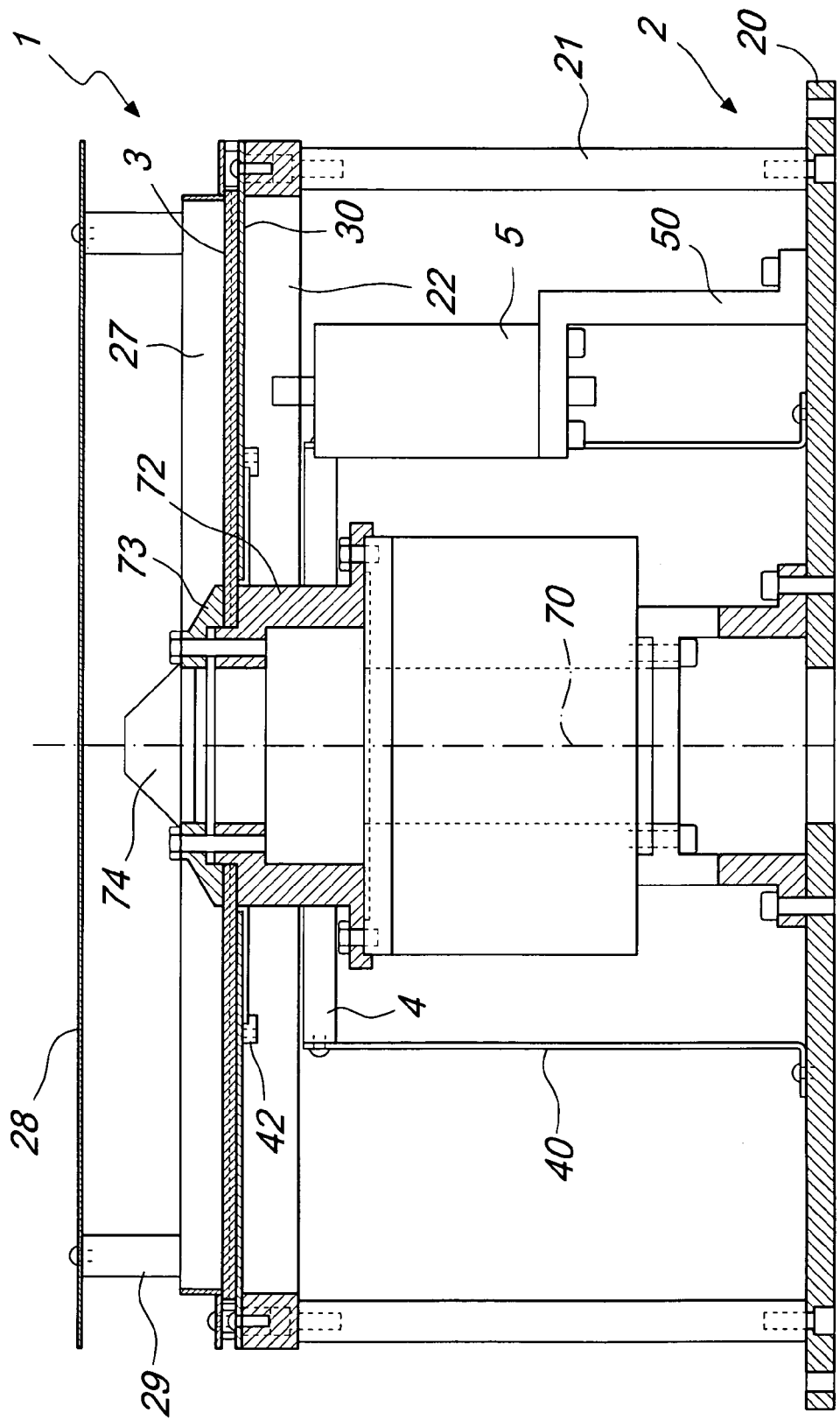
FIG. 3 is a sectional view of the feeder, taken along the line of FIG. 2.
Figure 4:
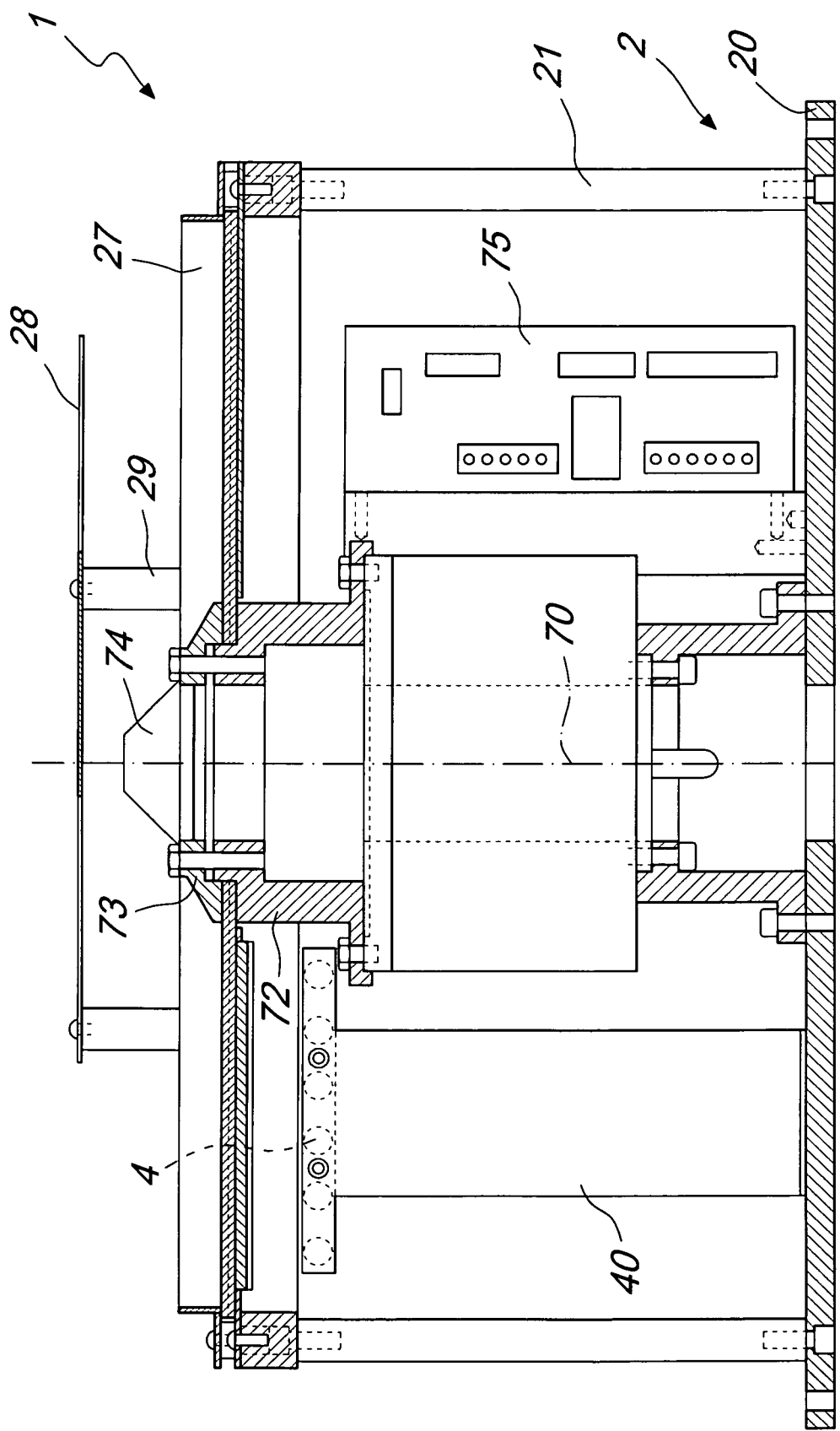
FIG. 4 is a sectional view of the feeder, taken along the line IV-IV of FIG. 2.

With reference to the figures, a feeder for robots, automation means and the like, according to the invention, generally designated by the reference numeral 1, comprises a frame 2, which has a supporting bed 3 for the parts to be fed and vision means for recognizing the parts.

A fundamental characteristic of the invention is that the bed 3 is connected to means for rotation about a direction that is substantially perpendicular to the plane of arrangement of the parts to be fed.

The frame 2 can comprise a base plane 20, on which supporting columns 21 for a supporting ring 22 are fitted; the bed 3 can move freely on the ring 22.

Normally, such rotation means comprise a motor 7, which is connected to the frame 2, such as for example an asynchronous motor, which is fixed to the base plane 20 by means of a motor support 71.

In the embodiment presented here, the bed 3 coincides with the plane of arrangement of the parts.

Advantageously, the rotary motion the bed is provided with due to the rotation means can occur around the direction that is substantially perpendicular to the plane of arrangement of the parts which coincides with an axis 70 of the driving shaft of the motor 7.

In the embodiment presented here, the bed 3 is keyed to the driving shaft and is locked on it so as to rotate jointly therewith, by means of a traction flange 72 and a locking flange 73.

Advantageously, the rotation means can comprise a motor driver 75, which is connected to a bracket 76 that is fixed to the base plane 20 of the frame 2. In this manner, the motor 7 can work with accelerations and/or speeds which are controlled and variable depending on the characteristics of the parts that are loaded into the feeder 1.

The motor 7 can further be provided with a plug 74 for protection of its internal parts.

Advantageously, the feeder can comprise impulse generation means which are connected to the frame 2 and operate on an internal surface 30 of the bed 3 with respect to the feeder 1.

The impulse generation means may comprise a bounce magnet 5, which is associated with a movable slider 50 connected to the base plane 20.

As an alternative, for example, the impulse generation means can comprise a pneumatically-operated actuator which is associated with the slider 50.

Preferably, such magnet is arranged in a peripheral position with respect to the center of the bed 3.

The vision means for recognizing the parts to be fed can comprise an optical television camera and lighting means, which are preferably fixed to the frame 2.

These vision means can be arranged externally with respect to the feeder; in the embodiment described here, they are arranged within the feeder 1.

Advantageously, the lighting means can comprise a lighting assembly 4, which is supported by a supporting frame 40, which is associated with the base plane 20.

The base plane 20 can be provided with a wall ring 27 for retaining the parts to be fed on the bed 3.

The feeder may further comprise an anti-bounce cover 28, which covers at least one portion of the bed 3. The cover 28 is connected to the frame 2 by means of posts 29, which are fixed to the base plane 20, and is meant to prevent the parts from escaping from the perimeter of the bed 3.

Finally, it is possible to provide protective glazing for the lighting assembly 4, which is fixed to the frame 2 by means of a supporting rim 42.

Figure 5:
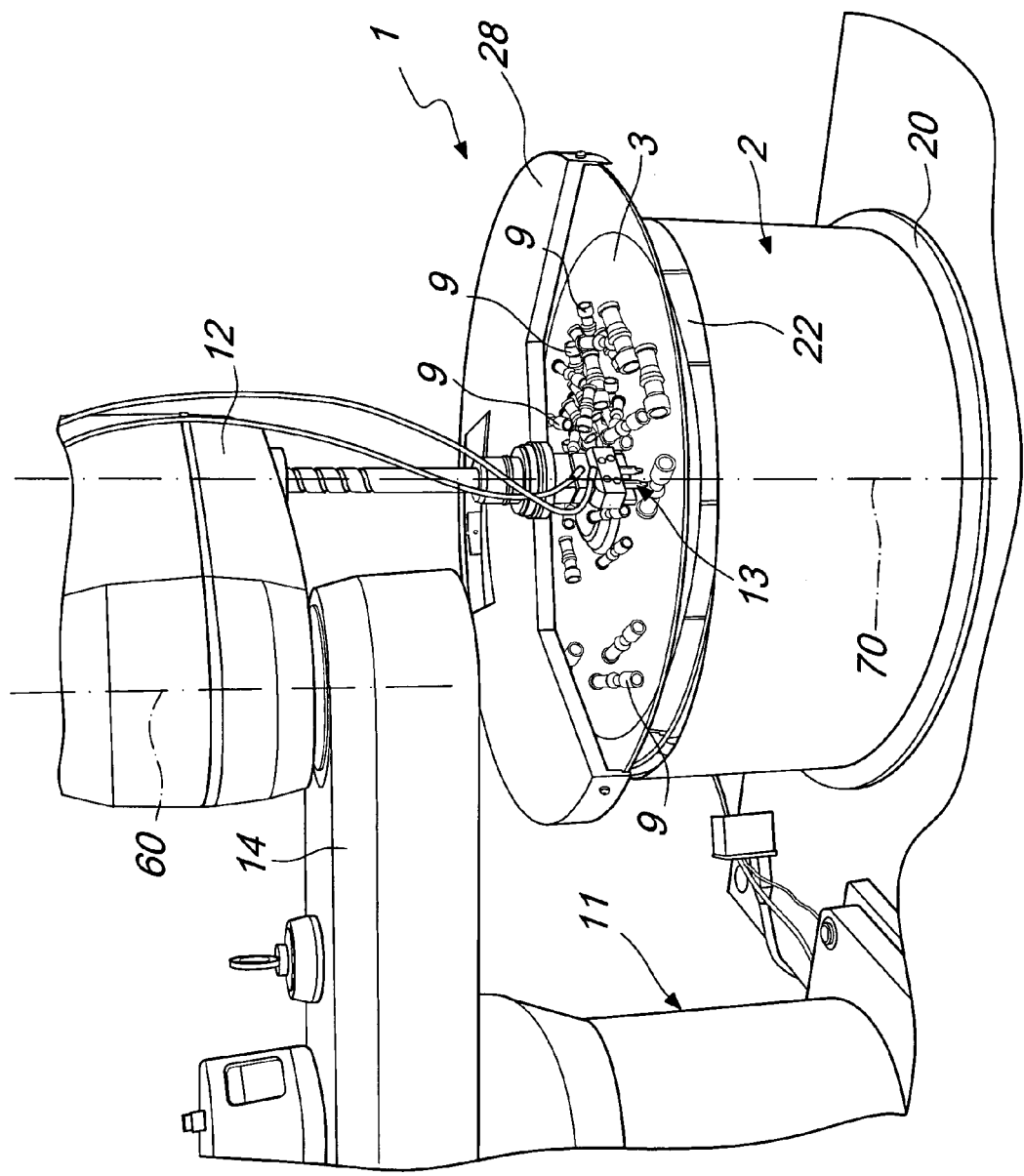
FIG. 5 is a perspective view of the feeder provided with grip means.

With reference to FIG. 5, advantageously there are provided means for gripping at least one of the parts 9 to be gripped, which are controlled by the vision means that select the part to be gripped.

Preferably, the grip means can comprise a movable arm 12, which has an engagement clamp 13. The arm 12 is coupled so as to rotate about a pivoting direction 60, which is parallel to the axis 70. Moreover, the arm 12 is adapted to move along a direction that is normal with respect to the supporting bed 3.

The arm 12 can further be supported by a load-bearing cross-member 14, which is connected to a column-like element 11 jointly connected to the frame 2.

The feeder can be filled at time intervals with the parts to be fed from the outside by means of a hopper, by means of a belt elevator, manually or by other per se known means.

The parts lie on the supporting bed 3 in a random position: the bed 3, provided with a rotary motion about the axis 70 of the driving shaft, at each turn places each part proximate to the robot that will have to grip the parts.

To make the parts face the robot with different faces so as to be able to statistically increase the chances of gripping for the robot, an oscillating motion of the motor 7 is added to the rotation about the axis 70.

In this manner it is possible to modify the position of the parts on the bed 3 during rotation and facilitate, as mentioned, gripping by the robot.

Due to the presence of the ring 27, the parts do not run the risk of escaping from the supporting bed 3 due to the centrifugal force produced by rotation.

For particular parts, for example parts having strongly rounded shape characteristics, or for very fragile parts that can be gripped by the robot only in one of their portions, the oscillating and rotary motions of the bed might not be sufficient for preventing the process from being slowed down.

In this case it is possible to activate the impulse generation means, in the solution described here, the bounce magnet 5; this is meant to push one or more of the parts so that it changes its arrangement as a consequence of the impact.

The parts do not run the risk of escaping from the feeder 1 due to the presence of the anti-bounce cover 28.

The magnet 5 can be controlled by the operator by the vision means and its relative position with respect to the frame 2 can be changed by activation of the movable slider 50.

The method for gripping at least one part by a feeder of a robot comprises the steps of loading the supporting bed 3 of the feeder with the parts 9 to be gripped, selecting at least one of the parts 9 to be gripped by vision means connected to the feeder, and picking up the selected part or parts.

A particularity of this method is that during the succession of such steps the parts 9 to be gripped are moved continuously.

In practice, gripping occurs when the parts are moving (grip in transit).

Advantageously, the method can include a step for varying the spatial orientation of the parts 9 to be gripped on the supporting bed 3.

Preferably, such step for varying the spatial orientation can comprise a scattering of the parts 9 to be gripped by the actuation of impulse generation means.

These impulses can be activated by the impulse generation means, such as for example the bounce magnet 5, which as mentioned is operated by the movable slider 50 and pushes one or more of the objects on the bed so as to change its/their arrangement position. These impulses, which are substantially normal with respect to the plane of arrangement of the objects to be gripped, make the part or parts jump that lie proximate to the point of contact with the supporting bed 3, changing completely the spatial orientation thereof.

Once the scattering step has ended, the objects to be gripped are chosen by means of the acquisition of images by the vision means of the robot. Then a selection is made among the objects to be gripped so as to identify the object to be chosen.

Preferably, the loading of the supporting bed 3 with the parts 9 to be gripped is performed continuously throughout the process, until work is completed.

Once gripping of the selected parts by the robot has been completed, with the actuation of the impulses, a new scattering step is provided, both of the objects that have just been loaded and of the objects that have not been gripped by the robot, avoiding the unloading of the feeder 1.

From what has been described above it is therefore evident that the invention achieves the intended aim and objects, and in particular the fact is stressed that a feeder for robots, automation means and the like is provided which makes it possible to change the position of the parts to be fed so as to favor statistically gripping by the robot.

In particular, the provision of impulse generation means that push the supporting bed for the parts to be fed makes it possible to optionally modify the arrangement of such parts as well.

Moreover, provision of the movement of such impulse generation means makes it possible to use the feeder according to the invention for a larger variety of parts both in terms of material and in terms of geometry.

Another advantage of the invention is that the availability of a system that makes it possible to change position and arrangement of each individual part requires minimal agitation of the parts and therefore makes the feeder for robots, automation means and the like according to the invention particularly suitable for processing parts with delicate portions or made of particularly fragile materials.

Further, minimization of shaking reduces the noise threshold, improving the quality of work in the factory where such feeder is used.

Another advantage of the feeder for robots according to the invention is that it provides, at least in the embodiment presented here, more space for the vision means inside the feeder, facilitating access to the interior of the feeder and thus simplifying the operations for cleaning such vision means.

Another advantage of the feeder according to the invention is the provision of a method for gripping at least one part selected from other objects arranged on the supporting bed of a feeder of a robot which makes it possible, in a single production cycle, to deplete all the items to be gripped.

In particular, the action of the impulse generation means, applied to a rotating and vibrating supporting bed, allows the operator at all times to change the spatial position of the objects deposited on the bed and therefore to avoid the unloading and subsequent reloading of the feeder with the objects rejected during sorting.

In this manner, the parts are gripped during their movement, and this allows an acceleration of the cycle, which operates at a higher rate.

Another advantage of the invention is that because of the generated pulses the action of assigned personnel in case of jammings is no longer necessary, therefore increasing the final efficiency of the system.

Another advantage of the gripping method of the invention is that by having eliminated the movement means for unloading from the feeder the rejected parts and the other movement means for transport and loading of the parts to be gripped, it allows evident economic savings.

Moreover, the use of materials that are easily available and simple constructive mechanics make the feeder for robots, automation means and the like according to the invention competitive from the economic point of view as well.

The invention thus conceived is susceptible of numerous modifications and variations, all of which are within the scope of the appended claims.

All the details may further be replaced with other technically equivalent elements.

In practice, the materials used, as well as the dimensions, may be any according to requirements as long as they are consistent with the constructive purpose.

The disclosures in Italian Patent Application No. AR2008A000032 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

What is claimed is:

1. A feeder for robots and automation means, comprising a frame that has a supporting bed for the parts to be fed and vision means for recognizing said parts to be fed, wherein said supporting bed is connected to rotation means for rotation about a direction that is substantially perpendicular to the plane of arrangement of said parts to be fed, the feeder further comprising impulse generation means which are connected to said frame and operate on said supporting bed, wherein the impulses activated by said impulse generation means are substantially normal with respect to the plane of arrangement of the objects to be gripped, so as to make the part or parts jump that lie proximate to the point of contact with said supporting bed changing completely the spatial orientation thereof.

2. The feeder according to claim 1, wherein said frame comprises a base plane, which supports supporting columns for a supporting ring for said supporting bed.

3. The feeder according to claim 2, wherein said vision means comprise lighting means associated with said frame.

4. The feeder according to claim 3, wherein said lighting means comprise a lighting assembly, which is supported by a supporting frame associated with said base plane.

5. The feeder according to claim 1, wherein said rotation means comprise a motor, which is connected to said frame and is dependent on the characteristics of said parts to be fed.

6. The feeder according to claim 5, wherein said direction which is substantially perpendicular to said plane of arrangement of said parts to be fed coincides with an axis of a driving shaft of said motor.

7. The feeder according to claim 6, wherein said supporting bed is jointly associated to said driving shaft.

8. The feeder according to claim 6, further comprising means for gripping at least one of said parts to be gripped, which are controlled by said vision means.

9. The feeder according to claim 8, wherein said grip means comprise a movable arm, which has an engagement clamp, said movable arm being retained for rotation about a pivoting direction that is parallel to said axis and being further adapted to move along a direction which is normal to said supporting bed.

10. The feeder according to claim 1, wherein said impulse generation means comprise a bounce magnet, which is connected to said frame and operates on an internal surface of said supporting bed.

11. The feeder according to claim 10, wherein said impulse generation means comprise a movable slider for the movement of said bounce magnet, which is connected to said base plane.

12. The feeder according to claim 10, wherein said impulse generation means comprise a pneumatically-operated actuator, which is connected to said frame and operates on the internal surface of said supporting bed.

13. A method for gripping at least one part of a feeder of a robot, comprising the steps of loading the supporting bed of said feeder with parts to be gripped, choosing at least one of said parts to be gripped by vision means for recognition of the parts to be fed, said vision means being connected to said feeder, and picking up said at least one of said parts to be gripped, wherein during the succession of said steps said parts to be gripped move continuously, further comprising a step for varying a spatial orientation of said parts to be gripped on said supporting bed, said step of varying the spatial orientation comprising a scattering of said parts to be gripped by the actuation of impulse generation means, wherein the impulses activated by said impulse generation means are substantially normal with respect to the plane of arrangement of the objects to be gripped, so as to make the part or parts jump that lie proximate to the point of contact with said supporting bed changing completely the spatial orientation thereof.

14. The method according to claim 13, wherein the loading of said supporting bed with said parts to be gripped is performed continuously.

* * * * *